United States Patent [19]

Numata et al.

[11] Patent Number: 4,460,971

[45] Date of Patent: Jul. 17, 1984

[54] TERMINAL APPARATUS USING REGISTER INFORMATION TO DETERMINE THE MEANING OF A BUFFER STORED FIELD DEFINING CHARACTER

[75] Inventors: Kou Numata; Nobutaka Nomura, both of Hadano, Japan

[73] Assignee: Hitachi, Ltd., Tokyo, Japan

[21] Appl. No.: 285,733

[22] Filed: Jul. 22, 1981

[30] Foreign Application Priority Data

Jul. 22, 1980 [JP] Japan ............................ 55-100271

[51] Int. Cl.[3] ............................................ G06F 3/14

[52] U.S. Cl. ............................................ 364/900

[58] Field of Search ......................... 364/900 MS File

[56] References Cited

U.S. PATENT DOCUMENTS 4,064,490 12/1977 Nagel ................................ 364/900

*Primary Examiner*—Raulfe B. Zache

*Attorney, Agent, or Firm*—Antonelli, Terry & Wands

[57] ABSTRACT

A terminal apparatus for handling data by the field. Each field comprises a field defining character for defining an attribute of the field and a certain number of field data following the character. Information for determining the meaning of the field defining character is retained in the terminal apparatus and the attribute of the field is determined by the combination of the information and the field defining character. As a result, many field attributes can be specified.

6 Claims, 7 Drawing Figures

TERMINAL APPARATUS USING REGISTER INFORMATION TO DETERMINE THE MEANING OF A BUFFER STORED FIELD DEFINING CHARACTER

BACKGROUND OF INVENTION

The present invention relates to a terminal apparatus which is connected to a central processing unit and handles data by the field.

Terminal apparatus typically include display terminals (which are sometimes called video data terminals) and printer terminals and are connected to the central processing unit to transfer data between the central processing unit and the terminal apparatus. The field is defined as a group of successive data. Each field comprises a field defining character at the leading end for defining an attribute of the field and a certain number of field data characters following the field defining character. Each field begins from a field defining character and ends immediately before the next field defining character. In a terminal apparatus which handles data by the field, the designation of a display format, the designation of allowance of entry and the designation of printout are carried out by the field defining character for each field to provide a display which is easy to view, to prevent destruction of the display screen by improper operation and to reduce the amount of the printout.

As the versatility of the function of the terminal apparatus and the enhancement of the operability are required, many types of fields are required. As a result, the number of bits of the field defining character transferred from the central processing unit increases and it may be that several bytes at a time will be transferred. An area of a data buffer in the terminal apparatus which is provided to store the field defining characters also expands accordingly.

In the terminal apparatus, the several bytes of the field defining character transferred from the central processing unit is edited by a microprogram control unit to store them in the data buffer; accordingly, as the number of types of the fields and the number of the fields which are defined by the field defining characters increase, the number of bytes constituting the field defining characters transferred from the central processing unit to the terminal apparatus increases. Consequently, the area of the data buffer of the terminal apparatus occupied by the field defining characters expands and the area occupied by normal data (graphic characters) is reduced accordingly, or an additional area of the data buffer is required for the normal data. As the number of the field defining characters transfered from the central processing unit to the terminal apparatus or vice versa increases, the throughput between the central processing unit and the terminal apparatus is deteriorated accordingly.

Another problem is that when a terminal apparatus which has more functions than a conventional terminal apparatus is required, the number of types of the defining characters increases resulting in an increase in the number of bytes of the field defining characters. As a result, a compatibility with the conventional terminal apparatus is no longer maintained and the terminal apparatus cannot be controlled by the program in a conventional central processing unit.

SUMMARY OF THE INVENTION

It is an object of the present invention to provide a terminal apparatus which minimizes the area of the data buffer of the terminal apparatus occupied by the field defining characters and makes it possible to define a number of fields.

It is another object of the present invention to provide a terminal apparatus which minimizes the number of the field defining characters transferred between the central processing unit and the terminal apparatus to improve the throughput.

It is a further object of the present invention to provide a terminal apparatus having an increased number of functions and which can be connected in the same manner as the conventional terminal apparatus is connected.

In accordance with the present invention, information for determining the meaning of the field defining character is stored in a register and the attribute of the field is determined based on the information in the register and the field defining character.

DESCRIPTION OF THE PREFERRED EMBODIMENTS

Figure 1:
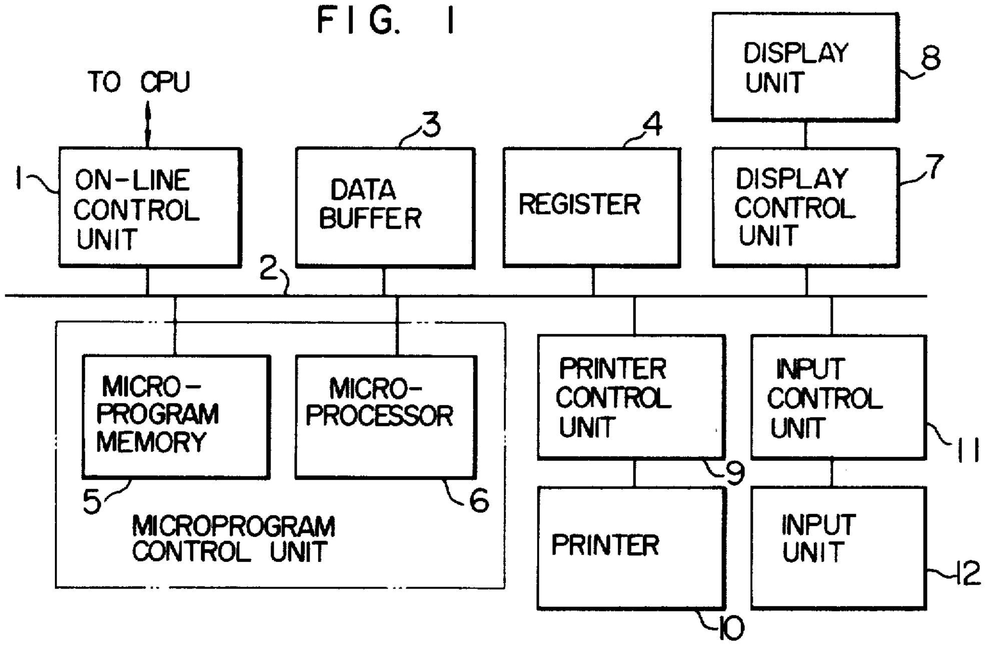
FIG. 1 shows a block diagram of a terminal apparatus in accordance with one embodiment of the present invention.

A terminal apparatus as seen in FIG. 1 is connected to a central processing unit through an on-line control unit 1, which is connected to a data bus 2, to which a data buffer 3, a register 4, a microprogram memory 5, a microprocessor 6, a display control unit 7, a printer control unit 9 and an input control unit 11 are connected. A display unit 8 is connected to the display control unit 7, a printer 10 is connected to the printer circuit unit 9, and an input unit 12 such as a keyboard is connected to the input control unit 11. The microprogram memory 5 and the microprocessor (hereinafter referred to as micro-CPU) 6 constitute a microprogram control unit.

Information transferred from the central processing unit to the terminal apparatus is divided into three major parts; a command information part for commanding operation of the terminal apparatus such as a write operation, erase-write operation or read operation; a control information part for specifying a detail of operation associated with the commanded operation such as a print command or an input lock release; and a data part comprising an address of the data buffer 3, and the field defining character and the graphic character to be stored in the data buffer 3. The command information part transferred from the central processing unit is receivd by the on-line control unit 1, thence it is sent to the micro-CPU 6 in the microprogram control unit through the data bus 2. The command is analyzed by the micro-CPU 6. The control information part transferred next is also supplied to the micro-CPU 6 for use as information to control the terminal apparatus. The control information field includes information to determine the meaning of the field defining character. This information is loaded into the register 4 through the data bus 2. The data part including the field defining characters transferred next is received by the on-line control unit 1, thence it is stored in the data buffer 3 through the data bus 2.

When the content of the data buffer 3 is to be displayed on the display unit 8 connected to the display control unit 7, the field defining character stored in the data buffer 3 and the information to determine the meaning of the field defining character, stored in the register 4 are read into the micro-CPU 6 by a program in the microprogram memory 5. The attribute of the field is determined by the combination of those informations. Thereafter, the data (graphic characters) in the field is sequentially processed and the processed data is sent to the display unit 8 through the display control unit 7 where it is displayed. This data also may be printed out by the printer 10. On the other hand, when the data is to be entered from the input unit 12 connected to the input control unit 11 to a field in the data buffer 3, the input data is sent to the micro-CPU 6 through the input control unit 11 and the field defining character stored in the data buffer 3 and the information for determining the meaning of the field defining character, stored in the register 4 are read into the micro-CPU by a program in the microprogram memory 5. Based on those informations, the attribute of the field is determined and based on the determined attribute the input data previously read is processed and the result is stored in the data buffer 3.

Figure 2:
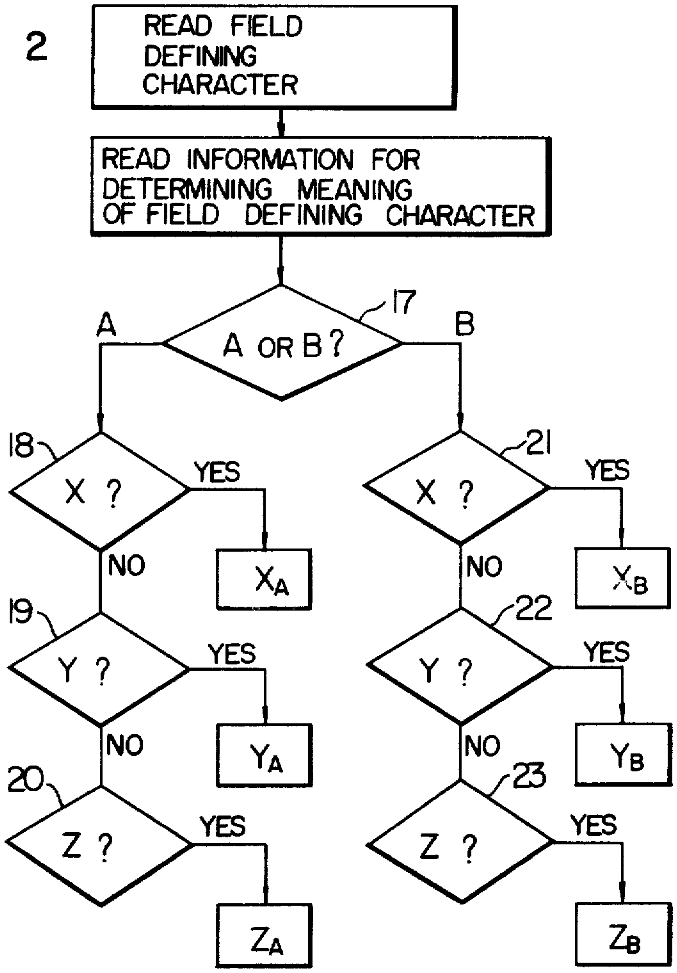
FIG. 2 illustrates a process flow of a microprogram for determining the attribute of the field.

FIG. 2 shows an example of the operation of the microprogram control unit for determining the attribute of the field. The information for determining the meaning of the field defining character loaded in the register 4 is represented by A or B. The field defining characters stored in the data buffer 3 are represented by X, Y and Z, and the attributes determined thereby are represented by $X_A$, $Y_A$ and $Z_A$ for the information A in the register 4 and $X_B$, $Y_B$ and $Z_B$ for the information B in the register 4. In a step 15 of the microprogram, the field defining character is read from the data buffer 3 and in a step 16 the information for determining the meaning of the field defining character from the register 4 is read in. In a step 17, the information A or B for determining the meaning of the field defining character is determined, and if it is A the process goes to a branch A. In a step 18 for determining the field defining character, if X is determined the attribute of the field is determined as $X_A$. Similarly, if Y is determined in a step 19, the attribute of the field is determined as $Y_A$, and if Z is determined in a step 20 it is determined as $Z_A$. If the information B is determined in the step 17, the process goes to a branch B and the attribute $X_B$, $Y_B$ or $Z_B$ of the field is determined at step 21, 22 or 23 for determining the field defining character.

Figure 3A:
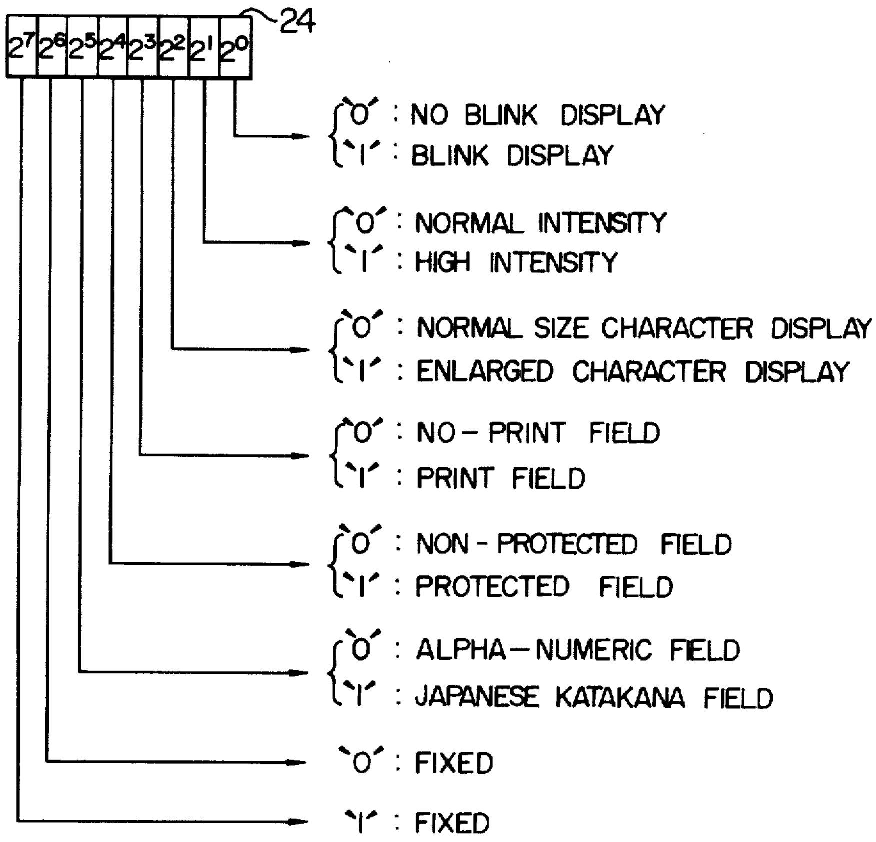
FIGS. 3A and 3B show bit configurations of field defining characters.
Figure 3B:
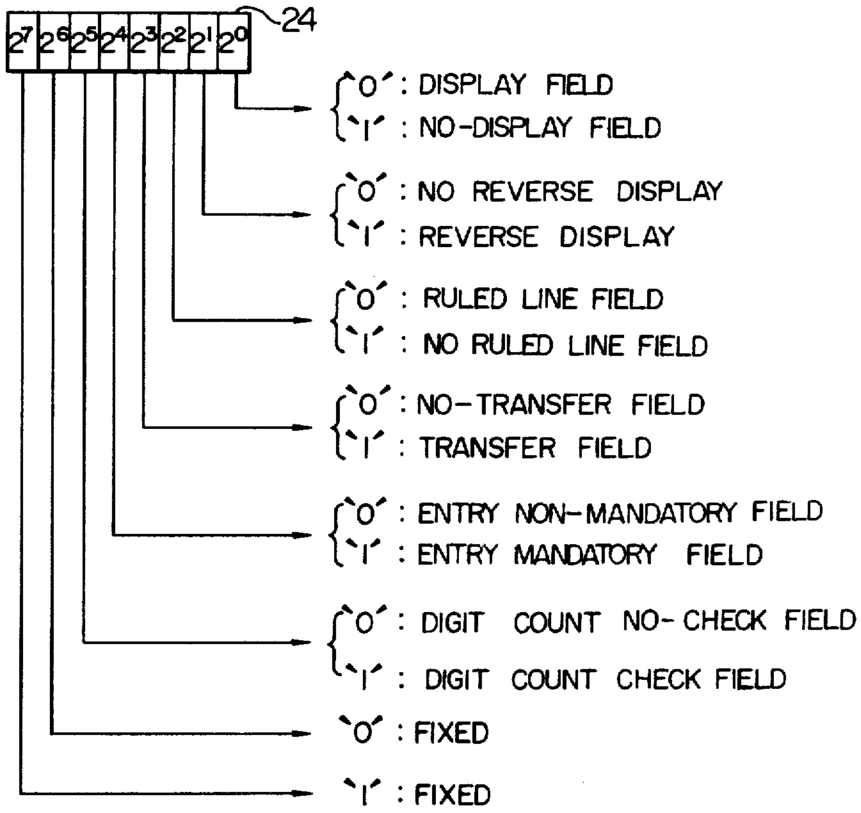

FIGS. 3A and 3B show examples of the bit configuration of the information representing the attribute of the field. FIG. 3A shows an attribute of the field when the information for determining the meaning of the field defining character is A and FIG. 3B shows an attribute of the field when the information is B. The "1's" in FIGS. 3A and 3B indicate that the corresponding bits are logical "1's" and the "0's" indicate that the corresponding bits are logical "0's ".

Figure 4A:
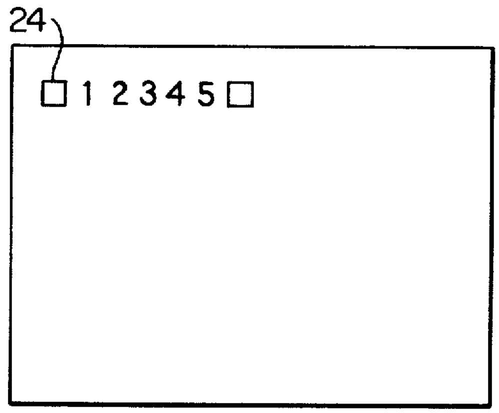
FIGS. 4A and 4B illustrate displayed images.
Figure 4B:
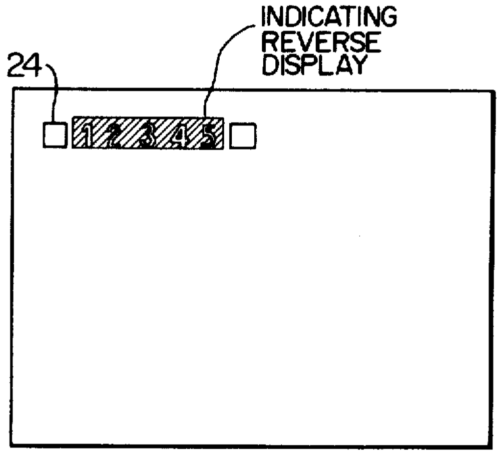

FIGS. 4A and 4B show examples of a displayed image. In the illustrated examples, a $2^1$ bit of the field defining character is "1". FIG. 4A shows the displayed image for the information A for determining the meaning of the field defining character and the graphic characters of the field are displayed with a high intensity. FIG. 4B shows the displayed image for the information B and the graphic characters of the field are reverse-displayed. The field defining character is not displayed on the display screen.

Figure 5:
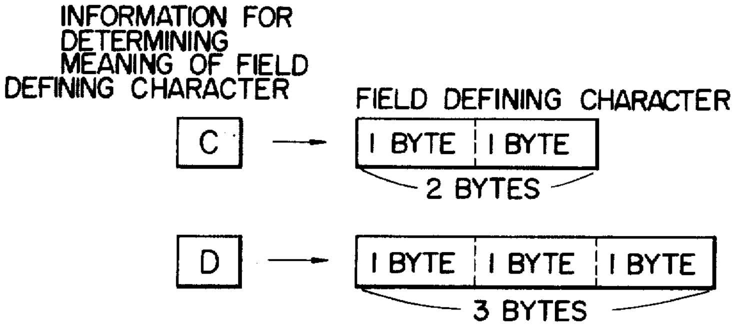
FIG. 5 shows a relationship between a field defining character and information for determining the meaning of the field defining character for explaining another embodiment of the present invention.

In the examples shown in FIGS. 3A and 3B, the field defining character of the same bit configuration is used to define the different fields. Alternatively, the number of bytes of the field defining character may be changed by the information for determining the meaning of the field defining character. This enables a terminal apparatus having more functions than a conventional terminal device to be connected to a central processing unit having a program for controlling the conventional terminal apparatus. It may be necessary in some circumstances to control the terminal apparatus having more functions by the program for controlling the conventional terminal apparatus although both the program for controlling the conventional terminal apparatus and the program for controlling the terminal apparatus having more functions are provided. The present invention allows such a control. Let us assume that the field defining character in the conventional terminal apparatus is of two bytes length while the field defining character in the terminal apparatus having more functions is of three bytes length in order to makes it possible to define more attributes of the field. FIG. 5 illustrates an example thereof, in which the information for determining the meaning of the field defining character is represented by C for the program in the conventional terminal apparatus so that the number of bytes of the field defining characters is interpreted as two bytes, and for the program in the terminal apparatus having more functions, the information for determining the meaning of the field defining character is represented by D and the number of bytes of the field defining character is interpreted as three bytes.

The information for determining the meaning of the field defining character loaded into the register 4 in FIG. 1 can be modified by an instruction of the control unit associated with a specific command (for example ERASE-WRITE command) transferred from the central processing unit or it can be modified by an order from the terminal apparatus. While the attribute of the field is determined by the combination of the field defining character and the information for determining the meaning of the field defining character in the embodiment shown in FIG. 1, it may be determined under a hardware control in the display control unit or the printer control unit.

In accordance with the present invention, many attributes of the field are available without increasing the data buffer area of the terminal apparatus and the data throughput for the central processing unit is enhanced. In addition, the terminal apparatus having more functions can be controlled by the program of the conventional terminal apparatus.

We claim:

1. A terminal apparatus for handling data by the field comprising a series of data, comprising:

first means for storing data including a field defining character located at a leading area of the field for defining the field;

second means for retaining information for determining the meaning of said field defining character; and third means connected to said first and second means for determining the attribute of said field based on said information retained in said second means and said field defining character.

2. A terminal apparatus according to claim 1, wherein said third means includes microprogram control means.

3. a terminal apparatus having at least an output unit capable of visual output of fields of data, the mode of the output being determined for each individual field of data, the apparatus comprising:

first storage means for storing therein at least a field defining character for defining each of the fields of data;

second storage means for storing thereon information for use in combination with said field defining character to provide a modified definition of each of said fields of data; and processing means coupled to said first and second storage means to receive therefrom said field defining character and said information for formulating said modified definition for each of said fields of data, thereby determining said mode of the output.

4. An apparatus according to claim 3, in which said first storage means has memory areas for storing said field defining character and data corresponding thereto.

5. An apparatus according to claim 3, and further including a supervisory unit connected to said first and second storage means, said field defining character and said information to be stored in said first and second storage means, respectively, being applied from said supervisory unit.

6. A terminal apparatus having at least a display unit for displaying data, comprising:

first storage means for storing therein a field defining character in a multi-bit format for each individual field, said field defining character serving to determine the mode of output of said data in terms of the binary states "1" and "0" of each of the bits of said field defining character;

second storage means for storing therein control information serving to modify the meaning of at least one of the bits of said field defining character; and microprocessor means coupled to said first and second storage means for modifying the meaning of at least one of the bits of said field defining character in dependence upon said control information read out from said second storage means.

* * * * *